(No Model.)

F. H. HUBBARD.
DEODORIZING AND ANTISEPTIC WATER CLOSET COVER.

No. 298,091. Patented May 6, 1884.

WITNESSES:
Chas. Nida.
C. Sedgwick

INVENTOR:
F. H. Hubbard
BY Munn & Co.
ATTORNEYS.

UNITED STATES PATENT OFFICE.

FREDERICK H. HUBBARD, OF BROOKLYN, NEW YORK.

DEODORIZING AND ANTISEPTIC WATER-CLOSET COVER.

SPECIFICATION forming part of Letters Patent No. 298,091, dated May 6, 1884.

Application filed January 14, 1884. (No model.)

*To all whom it may concern:*

Be it known that I, FREDERICK HEMAN HUBBARD, of Brooklyn, in the county of Kings and State of New York, have invented a new and Improved Deodorizing and Antiseptic Water-Closet Cover, of which the folowing is a full, clear, and exact description.

Reference is to be had to the accompanying drawings, forming a part of this specification, in which similar letters of reference indicate corresponding parts in all the figures.

Figure 1:
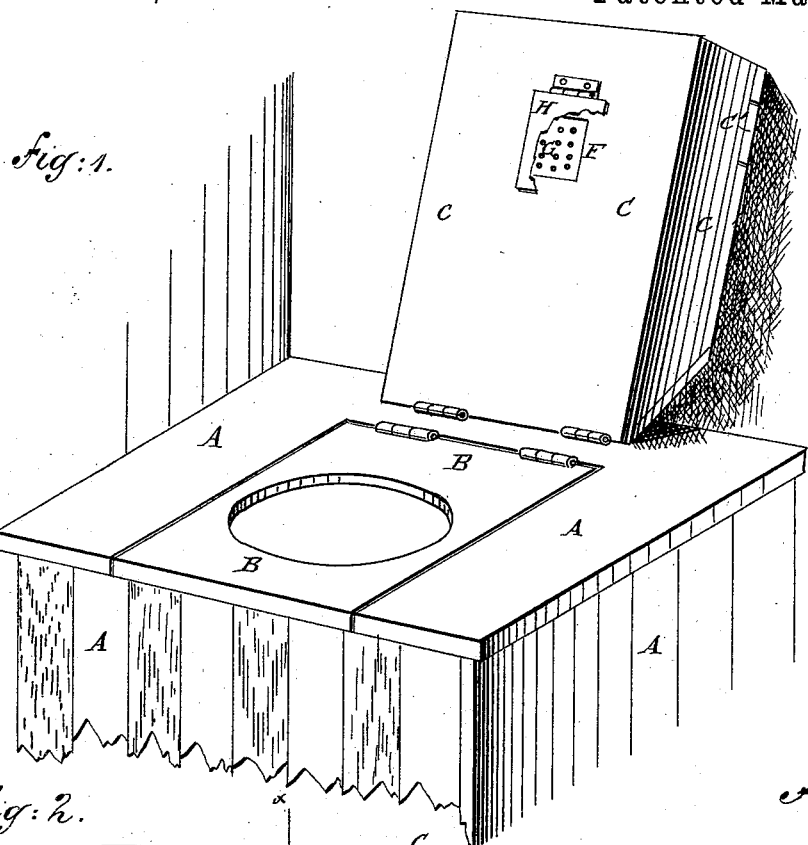
Figure 2:
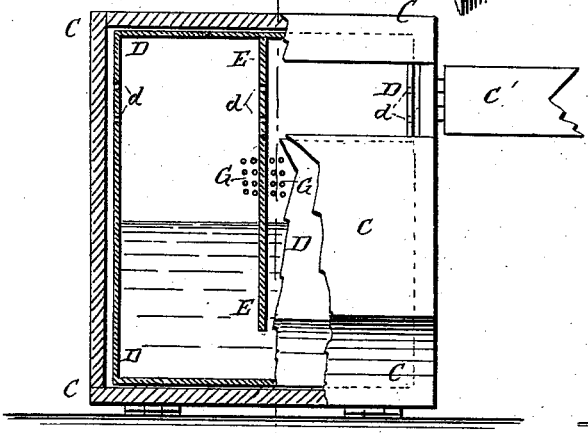
Figure 3:
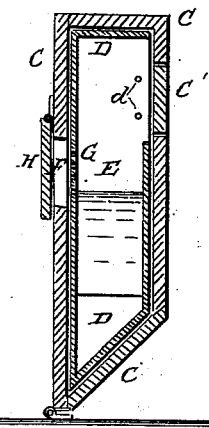
Figure 4:
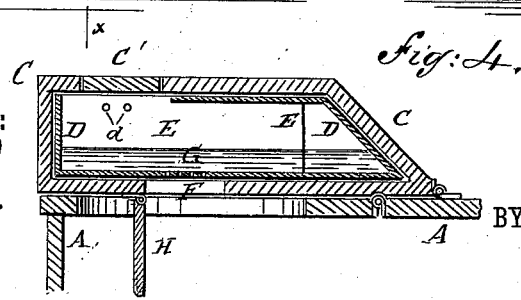

Figure 1 is a perspective view of my improvement shown as applied to a water-closet casing, part being broken away. Fig. 2 is a plan view of the improvement, partly in section. Fig. 3 is a sectional side elevation of the same, taken through the line $x\ x$, Fig. 2, and shown in a vertical position. Fig. 4 is the same section as Fig. 3, but shown in a horizontal position.

The object of this invention is to prevent the escape of sewer-gas and offensive odors from water-closets, and to destroy disease-producing germs in fecal matter as it is discharged into water-closet basins.

The invention consists in a water-closet cover made in box form, having a discharge-opening in its bottom, and provided with a non-corrosive interior vessel having a number of fine perforations in its bottom, whereby the liquid contents of the said interior vessel will be allowed to drip when the cover is closed, and the dripping will be prevented when the cover is open. The bottom of the cover is provided with a hinged flap arranged to cover the discharge-opening when the cover is raised and uncover the said opening when the said cover is closed. The interior vessel is made with its rear part closed at the top, and with fine perforations in its bottom, so that the liquid contents of the said vessel will be allowed to drip when the cover is closed, and the dripping will be prevented and the said contents kept from being spilled when the cover is opened, as will be hereinafter fully described.

A represents the casing, B the seat-board, and C the cover, of a water-closet. The cover C is made in the form of a covered box, of any desired thickness, and with its rear edge beveled, as shown in Figs. 1, 2, 3, and 4, to allow the cover to be turned back beyond a vertical position, so that it will be held open by its own weight.

Within the cover C is placed a vessel, D, of glass, porcelain, iron lined with porcelain, or of other non-corrosive material. The vessel D has the rear part of its upper side tightly closed, and the forward part open for convenience in pouring in water and supplying chemicals. The forward part of the vessel D can be provided with a partition, E, extending from the forward edge of the said vessel to any desired distance, a space being left between the rear edge of the said partition and the rear edge of the vessel for the free passage of the contents of the said vessel.

In the bottom of the cover C, and over the middle part of the opening in the seat-board B, is formed an opening, F, and in the bottom of the vessel D, over the middle part of the opening F, is formed a number of fine perforations, G. To the bottom of the cover C, near the forward edge of the opening F, is hinged a plate or flap, H, which, when the cover C is raised, as shown in Figs. 1 and 3, swings down over the opening F, to prevent the clothes of the person using the water-closet from coming in contact with any particles of the solution that may be adhering to the bottom of the vessel D. When the cover C is closed upon the seat-board B, the plate or flap H swings down into a vertical position, as shown in Fig. 4, uncovering the opening F, and being out of the way of the solution, dripping through the openings G. A part, C′, of the top of the cover C is left loose, and is hinged at one end to give convenient access to the vessel D for supplying the said vessel with water and chemicals.

In the forward part of the partition E, when used, and of the sides of the vessel D, is formed a number of small holes, $d$, to receive strings for securing asbestus bags or other suitable receptacles to contain the chemicals.

In using the cover chloride of lime is placed in one asbestus bag and sulphate of iron and bichloride of mercury in another, and the said bags are secured to the forward parts of the sides and partition of the vessel D, or any other suitable chemical or chemicals can be used. Such a quantity of water is then poured into the vessel D, that it will not overflow when the cover C is raised into a vertical position. With this arrangement, when the cover C is turned down, the water will dissolve the chemicals, and the solution will drip through the perforations G into the water-closet basin, rendering innoxious any sewer-gas that may find its way into the basin, and destroying all unpleasant odors. When the cover C is raised, all outflow of the solution is prevented. With this arrangement the feces will be discharged into an antiseptic solution contained in the basin, so that all disease-producing germs will be at once destroyed.

The chemicals can be replaced as required, and the vessel D must be kept supplied with water.

Having thus described my invention, I claim as new and desire to secure by Letters Patent—

1. The combination, with a hinged water-closet cover made in box form, of a non-corrosive vessel arranged in said cover and provided with a number of fine perforations in its bottom, substantially as herein shown and described, and for the purpose set forth.

2. The combination, with the hinged hollow water-closet cover C, having an opening, F, in its lower surface, of the non-corrosive vessel D, arranged in said cover and provided with the fine perforations G in its bottom over the opening of the cover, substantially as herein shown and described.

3. The combination, with the hinged hollow cover C, provided with the opening F in its lower surface, and the vessel D, arranged in said cover, and provided with perforations G over the opening of the cover, of the flap H, hinged to the cover, near the forward edge of its opening, substantially as herein shown and described.

4. In a water-closet cover, the non-corrosive interior vessel, D, made substantially as herein shown and described, with its rear part closed at the top, and fine perforations in its bottom, whereby the liquid contents of the said vessel will be allowed to drip when the said cover is closed, and the dripping will be prevented and the said contents kept from being spilled when the cover is opened, as set forth.

FREDERICK H. HUBBARD.

Witnesses:
   JAMES T. GRAHAM,
   EDGAR TATE.